Figure 1:
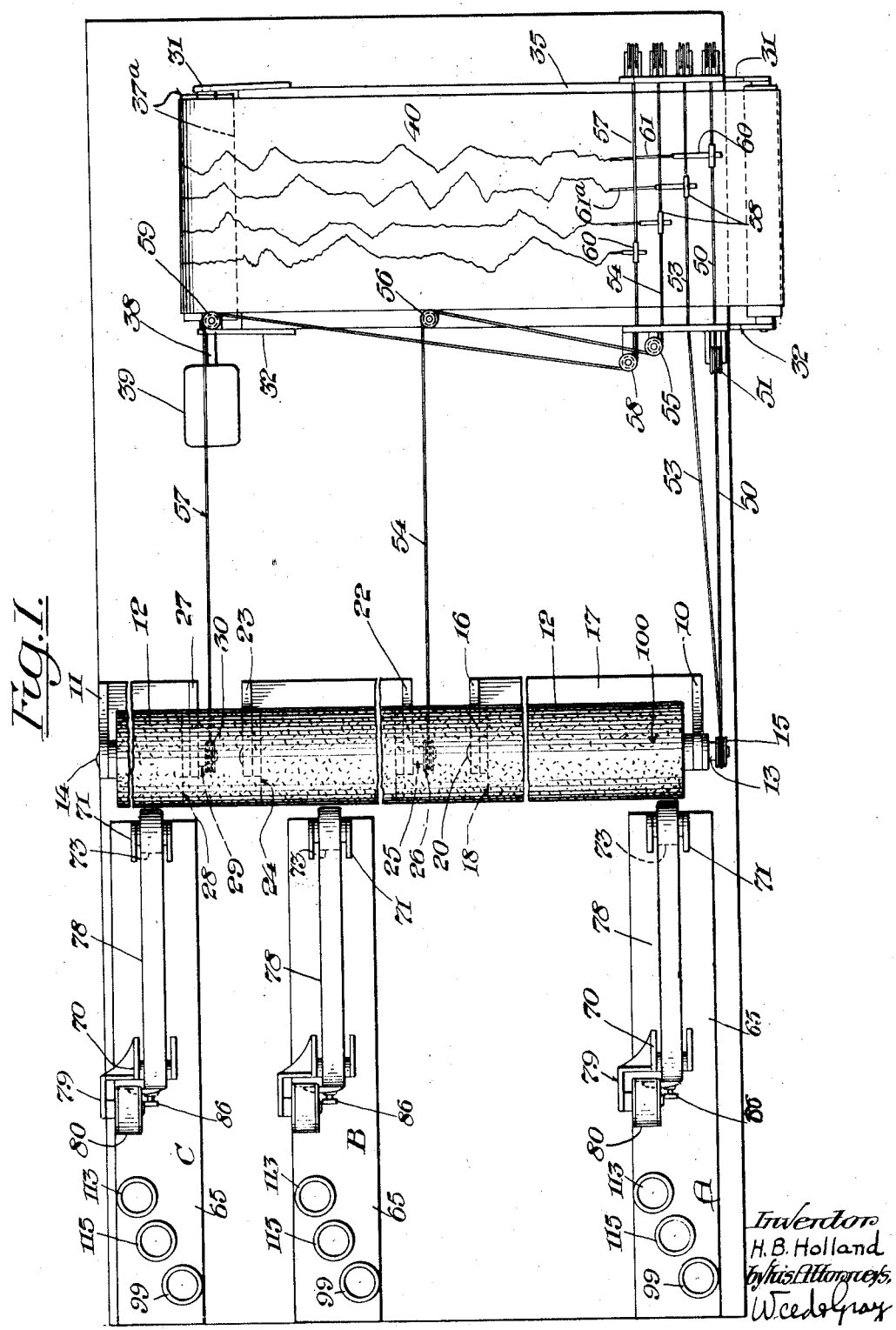

Aug. 12, 1930.  H. B. HOLLAND  1,772,605
GRAPHICAL RECORDING MEANS FOR STOCK QUOTATIONS
Filed Oct. 20, 1924  2 Sheets-Sheet 1

Inventor
H. B. Holland
by his Attorneys,

Aug. 12, 1930. H. B. HOLLAND 1,772,605
GRAPHICAL RECORDING MEANS FOR STOCK QUOTATIONS
Filed Oct. 20, 1924 2 Sheets-Sheet 2
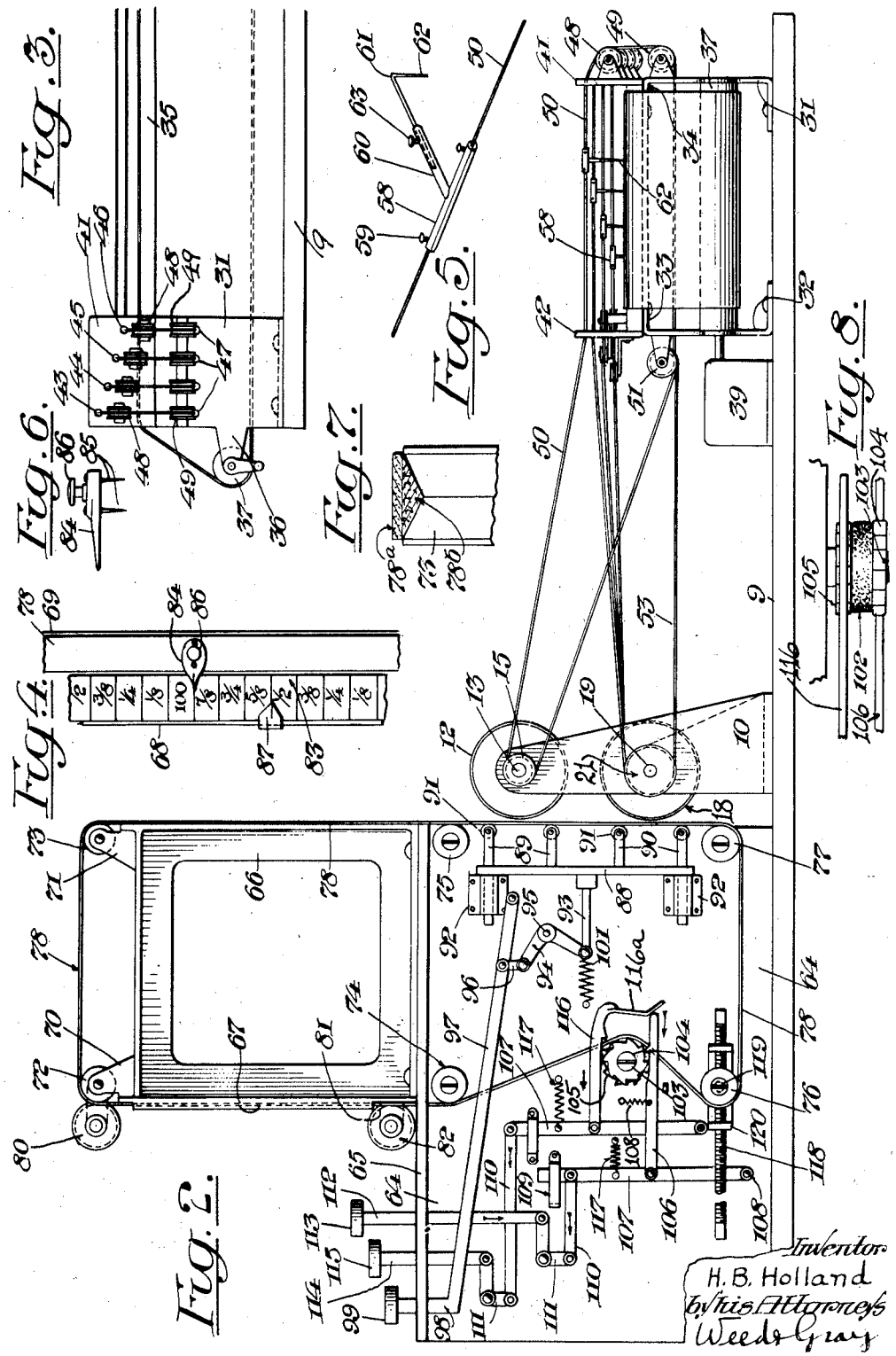
Inventor
H. B. Holland
by his Attorneys
Weed & Gray Patented Aug. 12, 1930

1,772,605

UNITED STATES PATENT OFFICE

HORACE B. HOLLAND, OF WOODSIDE, NEW YORK

GRAPHICAL RECORDING MEANS FOR STOCK QUOTATIONS

Application filed October 20, 1924. Serial No. 744,537.

This invention has for its object the provision of means and the method for graphically recording stock market quotations whereby the range of average of one or more groups of stocks may be continuously recorded by graph or diagram upon receiving the various quotations on the stock ticker, so that at any time during the market session the average of one or more predetermined groups of stocks and the trend of the group average may be instantly ascertained.

A further object of this invention is to provide means and the method for forming a continuous graph or diagram of the average price of a group of stocks during the market session so that the positon and trend of the average of the group may be continuously observed, the relation of the group average at any given time to previous closing group averages may be seen, the price of any individual stock may be observed at a given time and the relation of the price of any individual stock with the previous closing price as well as the prices of other individual stocks may be readily compared at any time during the market session.

A further object of this invention is to provide means and the method for recording by graph or diagram continuously from day to day the price of one or more stocks so that the trend or movement of the prices may be ascertained and compared from day to day as the market is in session and wherein means is provided for enabling the price at a given time of one or more stocks to be instantly observed and such price or prices compared with previous closing prices as well as with the individual prices of other stocks.

A further object of this invention is to provide a machine for graphically recording stock quotations wherein means or an indicating device is provided, preferably in the form of a scale representing fractional stock quotations and an indicator, for successively displaying or indicating the various price quotations of a stock and in which means is provided for operating the indicating device so as to display successive prices in the stock and at the same time for operating a graphical recording mechanism to form a record or diagram embodying each change in price. In the present preferred form I provide a plurality of similar mechanisms each representing a stock, and adapted to be operated for controlling the graphical recording means, so that as a result a continuous graph or diagram is formed representing the trend or movement of the composite average of the several stocks.

Other objects of this invention will appear in the following description and appended claims, reference being had to the accompanying drawings forming a part of the specification wherein like reference characters indicate corresponding parts in the several views and wherein Fig. 1 is a top plan view, partly broken away illustrating a form of mechanism whereby my invention may be carried out; Fig. 2 is a side elevation thereof; Fig. 3 is a detail end view illustrating a part of the recording mechanism; Fig. 4 is a fragmentary enlarged view illustrating the indicating device; Fig. 5 is a detail fragmentary view illustrating particularly a form of stylus or recording needle; Fig. 6 is a detail view illustrating the detachable indicator or pointer; Fig. 7 is a fragmentary view partly in section illustrating the manner in which the feed belt and pulley may be formed and Fig. 8 is a fragmentary plan view showing the ratchet mechanism for controlling the feed.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

The present machine in general is so constructed and operated that the changes in the price of each individual stock, comprising preferably one of a large group such as 200 stocks may be instantly registered on the machine, the registration of each such change whether up or down resulting in shifting the stylus or recording needle which produces a continuous diagram or graph on a movable record receiving surface such as a record sheet which is continuously moved or fed over a table at a predetermined rate of speed. This stylus or recording needle is sensitive to the changes in price of each of the stocks and will produce a diagram indicating the composite price of the entire group. In its preferred form my invention further contemplates the provision of a stylus for each smaller special group of stocks such as a group of rail stocks, industrial stocks, mining stocks, etc., so that the change in any stock registered by the stylus for the main or entire group average will also be registered by the stylus for the special group average. As a result it is possible to obtain not only a continuous graphical record of the range of the average for a given group, such as 200 stocks, but also a continuous graphical record of the range of average for each special group, such as industrial, oil, mining or rail stocks, whereby the trader at any time may observe the trend of the rails, industrials, oils, etc., and at the same time the trend of the entire group as well as the trend of each individual stock.

The registration of each change in price of each individual stock also results in the registration of such prices upon an indicator scale which is readily visible thereby enabling individual prices and comparative prices to be readily observed.

Heretofore it has been impossible for the trader to ascertain definitely and accurately the trend of the market or of special groups of stocks during the market session and the movement of the composite averages heretofore could be ascertained only in newspapers or publications a day or two afterward. By virtue of the present invention however, the movement or trend of any group of stocks may be ascertained at any time during the market session, thereby enabling the trader to take advantage of an upward or downward trend in the market while such movement is taking place.

In the drawings wherein I have illustrated by way of example a present preferred form of my invention, it will be seen that the mechanism is mounted upon a suitable base 9. Mounted at opposite sides of the base and spaced apart the required distance are a pair of standards 10 and 11 and a cylinder or feed roll 12 is journaled in the upper ends of the standards, this cylinder extending substantially the entire width of the base. The cylinder 12 is provided at opposite ends with axially extending spindles or stud shafts 13 and 14 which rotate in suitable bearings in the upper ends of the supports 10 and 11. Upon the outer end of the shaft 13 is secured a pulley wheel 15. Upon the base 9 is mounted a standard 16 which terminates beneath the cylinder 12 and is braced by means of a base plate 17 connecting the supports 10 and 16 together. A cylinder or roll 18 of less length than the cylinder 12 is journaled by means of stud shafts or spindles 19 and 20 to the standard 10 and the upper end of the standard 16. Mounted upon the outer end of the shaft 19 at the outer side of standard 10 is a pulley wheel 21. A pair of standards 22 and 23 which may be similar to standard 16 are mounted upon the base and journaled in the upper ends of these standards is a cylinder 24. The construction and manner of supporting the cylinder may be the same as the case of the cylinder 18, and the shaft 25 at one end of cylinder 24 is provided with a pulley wheel 26 which is secured thereto. At a suitable distance from the standard 23 a similar standard 27 extends from the base and another cylinder 28 is journaled in the upper end of standard 27 and in the standard 11, this cylinder as in the case of cylinders 18 and 24 being located at a suitable distance below the cylinder 12. The projecting shaft or spindle 29 of cylinder 28 has secured thereto a pulley wheel 30. It will be seen from the foregoing construction that the main feed cylinder 12 extends the entire width of the mechanism and beneath this cylinder are mounted a series of cylinders of less width, although preferably having the same diameter.

At one side of the foregoing cylinder mechanism are two pairs of upright bracket supports 31 and 32 which are bolted to the base and spaced apart a suitable distance. The upper ends of these supports project inwardly at 33 and 34 to provide horizontal flanges, and bolted to the upper face of these flanges is a table 35, the opposite end of the table being supported in a similar manner. The supports 31 and 32 at each end of the recording table (see Fig. 3,) are provided with projecting brackets 36, and journaled in brackets 36 at one end of the table is a feed roller 37. At the opposite end of the table a feed roller 37$^a$ is likewise carried by the supports and this roller is driven by means of a shaft 38 connected to a clock mechanism 39. By means of the latter the feed roller 37$^a$ is rotated at a predetermined rate of speed thereby causing the record receiving sheet 40 to be fed at a given speed from the feed roller 37 over the table 35 and reeled on the feed roller 37$^a$. Secured to the side edges of the table 35 adjacent to the feed roller 37 and above the same are a pair of upright supporting members 41 and 42.

As shown in Fig. 3, the supporting member 41 is provided with a series of apertures 43, 44, 45 and 46 which are spaced lengthwise of the record table and located in inclined relation. Below this series of apertures the supporting bracket 31 is provided with a series of apertures 47 which may be horizontally alined and vertically alined with the several apertures 43 to 46 inclusive. In like manner, the supporting member 42 and bracket 32 at the opposite side of the record table are provided with two sets of apertures. Journaled in suitable brackets secured to the supporting member 41 and located beneath the several apertures 43 to 46 inclusive are a series of pulley wheels 48 and beneath these are suitably mounted a corresponding series of pulley wheels 49.

A belt 50 extends over the pulley 15 and the upper run of this belt passes freely through an aperture 43 in bracket 42 horizontally above the record table through the aperture 43 in bracket 41, and the return run of this belt passes over a pair of pulleys 48 and 49 beneath the table and engages a pulley 51 journaled in suitable brackets extending from the outer face of supporting bracket 32. A belt 53 passes over pulley 21 and the upper run thereof travels freely through apertures 44 in the bracket members 41 and 42 horizontally above the record table, and thence travels over a pair of pulleys 48 and 49, through transversely alined apertures 47, beneath the table and thence to the pulley 21. A similar belt 54 passes over pulley 26 on the cylinder 24 horizontally over the table thru apertures 45, 47 and over a pair of pulleys 48 and 49. The belt 54 at the opposite side of the table is guided by means of pulleys 55 and 56. A belt 57 travels over the pulley wheel 30 on the cylinder 28 and passes freely thru apertures 46 and 47, over pulleys 48 and 49, and at the opposite side of the record table is guided by means of pulleys 58 and 59.

It will be noted that each belt 50, 53, 54 and 57 passes over its respective pulley wheel secured to one of the cylinders and travels horizontally above the record receiving sheet 40, and in the present instance these belts are located in banked relation. The several belts are preferably of relatively small cross section and if desired may be formed of flexible wire thereby enabling the size of the cylinders to be of reduced proportion as well as the size of the several pulley wheels connected to the cylinders 12, 18, 24 and 28. Secured to each belt above the record sheet is a suitable stylus or needle constructed to coact with the record sheet 40 to form the several diagrams or graphs. These needles or markers are preferably of substantially the same construction but are of different lengths as shown in Fig. 1 so that the marking points will engage the record sheet on a transverse line. Each stylus or marker comprises a holder comprising a split tube 58 adapted to be slipped over the wire or belt, such as belt 50 as shown in Fig. 5. The tube 58 is secured in proper position upon the belt by means of set screws 59. Extending from the tube 58 is a weighted tubular holder 60 into which is insertible a needle or stylus 61 which at its end is bent downwardly at 62 to provide a marking point engageable with the record sheet 40. The needle or stylus 61 is adjustable lengthwise in the holder 60 and held in position by means of set screw 63.

It will thus be seen that the position of each stylus may be adjusted transversely of the record sheet and the position of the marking point adjusted so that all of the needles or markers will have their marking points transversely alined.

At one side of the feed cylinders and mounted upon the base is an upright supporting plate 64 having a horizontal top 65. Upon this top is bolted a supporting plate 66 which preferably has a substantially less depth than the depth of the supporting plate 64 as shown in Fig. 2. Mounted upon the front vertical edge of the supporting plate 66 is a guide plate 67 which is bent up at the side edges thereof to provide side flanges or guides 68 and 69 (see Fig. 4). Mounted upon the upper edge of the plate 66 are a pair of brackets 70 and 71 carrying pulley wheels 72 and 73. In vertical alinement with these pulley wheels are mounted upon the supporting plate 64 a pair of pulley wheels 74 and 75. Vertically alined with these pulley wheels and mounted adjacent to the base of the supporting plate 64 is a pair of pulley wheels 76 and 77. A feed belt 78 travels over the several pulley wheels 72 to 77 inclusive and also travels within the vertical guideway formed by the flanged guides 68 and 69. Secured to one side of the bracket 70 is a right angled bracket 79 and rotatably mounted upon this bracket is a spool 80. A bracket 81 similar to bracket 79 is secured to the front bottom part of supporting plate 66 and journaled in this bracket is a spool 82. Wound upon each spool or reel 80 and 82 is a tape 83. This tape is horizontally lined to form a scale each subdivision of which represents a fraction of a point. In other words, the scale is divided into ⅛ point subdivisions so that every change in price of the stock either up or down may be indicated on the scale. The tape 83 is located between the guide flange 68 and the adjacent edge of the feed belt 78.

An indicator or pointer 84 is detachably connected to the belt 78. This indicator in the present instance may comprise a suitable pointer having a pair of downwardly extending pins 85 which may be thrust into the belt 78 to position the indicator at any given place on the belt 78, the pointer being provided with a knob 86 for manipulating the same. A fixed pointer 87 is secured to the flange 68 and projects over the scale.

It will be noted that the belt 78 extends over the rollers or pulleys 73 and 77 in close proximity to the face of cylinders 12 and 18. A releasable clutch device cooperates with the belt 78 so as to force it into and out of engagement with the surface of cylinders 12 and 18. This device comprises a vertical bar 88 having two pairs of horizontally projecting arms 89 and 90 each having a rotatable roller 91 at the outer end thereof and engaged with the inner face of belt 78. The upper and lower arms 89 and 90 extend thru suitable guides 92 secured to the plate 64. Midway of the bar 88 extends rearwardly a link 93, to the rear end of which is pivoted one arm of a bell crank lever 94, this lever being pivoted at 95 to the supporting plate 64. A link 96 is pivoted to the opposite arm of the bell crank lever and also to a swinging lever 97. This lever at its outer end has a vertical extension 98 projecting through a hole in the top 65 and provided with a key 99. By pressing down on the key 99 the bar 88 will be forced inwardly thereby forcing the belt 78 into engagement with the frictional surface 100 of cylinders 12 and 18. When the key 99 is released the clutch bar 88 will be withdrawn by means of spring 101. The feed belt 78 is shifted in either direction by means of a pulley wheel 102 engaging the belt between pulley wheels 74 and 76, this wheel having a frictional surface. The feed pulley 102 is rotatably mounted upon a shaft 103 and is rotated step by step in either direction by means of a pair of ratchet wheels 104 and 105. A pawl rod 106 is pivoted at one end to a swinging lever 107, the opposite end of the rod 106 having a pawl engaging the teeth of ratchet 104, the pawl being held in position by means of a spring 108. The lower end of lever 107 is pivoted at 108 to plate 64 and at the upper end is guided within a guide strip 109. A link 110 is pivoted to lever 107 and to this link is pivoted one arm of a bell crank lever 111 and to the opposite arm of lever 111 is pivoted a vertical plunger 112 extending through the top 65. The key 113 is secured to the upper end of plunger 112 and by pressing down on this key, pawl 106 will be shifted in the direction of the arrows thereby rotating ratchet 104 and pulley 102 one step and thus shifting the belt 78. A plunger 114 also extends thru the top 65, being provided at its upper end with a key 115. This plunger 114 is connected substantially as in the case of plunger 112 to a pawl rod 116 which has a pawl engaging the teeth of ratchet wheel 105. This ratchet wheel is rotated in the opposite direction by pawl rod 116 so that when the plunger 115 is pushed down the feed pulley 102 will be rotated in the opposite direction than when key 113 is pushed down. By means of springs 117 the swinging levers 107 will be returned to normal position upon releasing the plunger 112 or 114. The tooth of pawl rod 116 is so located with respect to ratchet 105 as to provide a slight degree of lost motion, which permits the teeth of the ratchet to clear the tooth of pawl rod 116 upon operation of rod 106. When the rod 116 is operated to rotate the ratchet in the opposite direction cam 116ª carried thereby will engage rod 106 and force it downwardly to permit the teeth of ratchet 104 to clear the tooth thereof.

In order to adjust the feed tension of belt 78, the roller 76 is mounted upon a lengthwise adjustable screw 118 which is threaded thru the hub 119 of the roller. The adjusting screw 118 is mounted in the projecting ends of a bracket 120, and the hub 119 of the roller travels in a slot in the face of this bracket. By turning the adjusting screw the roller or pulley 76 will be shifted so as to tighten or loosen belt 78.

In the operation of the foregoing mechanism it will be seen that when the operator presses down on key 99 the several rollers 91 will press the belt 78 against the friction surface 100 of cylinder 12 and also against the friction surface of cylinder 18. At the same time a step by step movement of the belt 78 will be produced by pressing down either key 113 or key 115, it being understood that the movement in either direction imparted to belt 78 thru friction roll 102 will be imparted to cylinders 12 and 18 due to the gripping engagement of belt 78 with the cylinders. This rotary movement of cylinder 12 will shift belt 50 and impart a lateral movement to needle or stylus 61. The rotary movement of cylinder 18 will shift belt 53 and impart a lateral movement to stylus 61ª. The mechanism designated in general as A in Fig. 1 and just described constitutes a unit which is provided for each stock. The cylinder 12 is of sufficient length to permit the utilization of as many units A as there are individual stocks to be considered in the graphical record.

In its preferred form I desire to graphically record the composite averages for 200 stocks, such as listed on the New York Stock Exchange. A unit identical with the mechanism of unit A heretofore described will be provided for each stock and the belt 78 of the 200 units will engage side by side the frictional surface of top cylinder 12.

Thus the needle 61 will graphically record the composite average of the price changes of the entire 200 stocks. I desire also to graphically record the composite averages of special groups of stocks such as the railroad, oil, industrial stocks, etc. The smaller cylinder 18 may for instance be used for a predetermined group of railroad stocks, the cylinder 24 for a group of industrial stocks, and the cylinder 28 for a group of oil stocks. All of the units A representing the railroad stocks will be grouped together and will operate simultaneously against cylinders 12 and 18. Another group of similar units B will operate against cylinders 12 and 24 and a third group of units C will operate against cylinders 12 and 28.

In the drawings I have illustrated one unit of each group, since all of the units are identical. When the market opens the tape 83 is shifted to cause the fixed pointer 87 to designate the closing price of the particular stock on the day before, such as 99⅝ as shown in Fig. 4. Assuming on the first transaction of this stock that the stock ticker gives a quotation of 100, then the operator presses down on key 99 of the unit corresponding to this stock, then presses down three successive times on key 113 thereby imparting three equally defined movements to two of the needles such as needles 61 and 61ª, assuming that the particular stock is a railroad stock.

It will be noted that each operation of one of the key controlled plungers 112 or 114 will shift the belt 78 and the pointer 84 a distance on the scale 83 to represent a change of ⅛ of a point, so that each such operation will cause the pointer 84 to display on the scale the changed price quotation of the stock. At the same time a movement will be imparted to two of the needles in proportion to the movement of pointer 84. It will be understood that as the quotations for the various stocks come over the ticker it is merely necessary for the operator to operate the particular unit A, B or C corresponding to such stock, and by observing the previous quotation on the scale may register the change in price either up or down by plungers 112 or 114. The operation of one unit will not interfere with the operation of another unit since by releasing key 99 the feed belt 78 of each unit will be disengaged from the cylinder 12.

Thus it will be seen that by means of fixed pointer 87 of each unit A, B, C, etc., the previous closing quotations of each stock of the entire group, such as 200, may be seen at any time from the front of the machine. At the opening of the market the pointer 84 is attached to belt 78 in position also to designate the previous closing price, so that at the market opening both pointers or indicators will designate the same price on each particular stock unit A, B, C, etc.

In the present instance I have adopted smoked paper as the record sheet, the stylus in this case having a needle point which will trace on the record sheet a very accurate and clear diagram or graph and will be sensitive to all movements representing fractional price changes.

It will be understood that the cylinders and pulleys carried thereby will be in such proportion that each needle will move on the record sheet the same distance for the same fractional variation in price of any stock. The teeth of each ratchet wheel 104 and 105 are arranged so that each step by step movement in either direction will move belt 78 and thereby indicator 84 a distance on scale 83 indicating ⅛ point change. It will of course be understood that each point by point rise or fall in the market price for the stocks represented by the units is recorded by the units A, B, C, etc., each representing one stock, successively and not simultaneously. Therefor if one stock advances 200 points on the scale (assuming that 1 point on the scale represents ⅛ point rise or fall in the market price), it will necessitate 200 successive operations on the controlling key of the unit representing that particular stock; or, if 200 different stocks each advance one point on the scale, each stock being represented by a unit, each of those 200 units must be operated successively, making likewise 200 operations on the respective controlling keys in all. Assuming then, that a record of 200 stocks is being made, and that the circumference of cylinder 12 is 50 inches, the working circumference of pulley 15 is 1 inch, and assuming that 1 inch equals a one point change on scale 83; then if one stock advances 200 points on the scale or 200 stocks advance each one point on the scale, cylinder 12 will be revolved four times by successive operations of the key plungers, and needle 62 will be shifted laterally four inches. Assuming also, that feed cylinder 18 is used for a group of 50 industrial stocks, and has a circumference of 50 inches, then the pulley 21 would have a working circumference of 4 inches. While the entire group of 200 stocks advanced, for example, each 1 point, each of the 50 industrials would likewise advance. This advance of the special group of fifty industrials would result in revolving cylinders 12 and 18 once each, but since pulley 21 would have a working circumference four times as great as pulley 15, the average advance of 1 point in the group of 50 industrials and in the entire group of 200 stocks, would be recorded by an equal movement of needles 61 and 61ª, namely four inches.

In Fig. 7 I have illustrated a modified form wherein the pulley or sheave, such as pulley 73 for example, may have a V-shaped groove, and to prevent slippage the belt 78 may have an inner layer 78ᵇ of leather and an outer layer 78ª of felt. The several feed cylinders and feed roller 102 have a suitable frictional or abrasive surface which will engage the felt surface 78ª and prevent any slippage or lost motion.

The term "stock" as used herein is intended to cover bonds and various forms of securities and commodities, the market prices of which tend to fluctuate.

It will be understood that by describing in detail herein any particular form, structure or arrangement, it is not intended to limit the invention beyond the terms of the several claims or the requirements of the prior art.

As hereinbefore stated, there are three keys shown for each unit—one, to engage the belt 78 with the rotating members, drums or cylinders; one, to operate the belt step by step in one direction, and one to operate the belt step by step in the opposite direction—and, therefore, there is one unit of keys for each stock, so that for ten stocks there would be ten units and for two hundred stocks, two hundred units of keys in the bank of keys before the operator. As it would be humanly impossible for an operator of the machine to remember or carry in his mind the number of times he must operate or depress the respective keys properly to record the varying quotations, it is, therefore, obvious that some means is required for directing or guiding him in the operation of the keys. In other words, as he has a number of keys to depress,—possibly during each minute of the day and sometimes as fast as possible it would obviously be impossible for him to keep in mind just how many times he is to depress or has already depressed each key,—especially where the quotations on several stocks are quickly changing, they usually going up and down frequently,—unless some means were provided for guiding and showing him that he is depressing the keys properly, for it would be humanly impossible for an operator to carry in his mind the number of times each key is to be depressed or has been already depressed to indicate the varying changes in different stocks and, therefore, the indicating means herein provided is not alone for the purpose of indicating the changed quotations of a stock to a customer, but serves the very useful and necessary purpose of guiding the operator and showing him, first, whether it is necessary to reverse any of the belts, and, secondly, whether he is operating the keys the proper number of times to show the changes in the quotations of the stock. For instance, without such guiding means, an operator might depress either the key 113 or 115 of several units one time too many or one time too less, which would result in a very inaccurate record of the average of the value of a series of variable quotations and thus cause a customer a serious monetary loss—so that, without some such guiding means, it could never be ascertained with accuracy whether the recording means has been properly operated or not, and therefore, it could not be determined whether the recording means correctly shows the result intended to be shown.

Having thus explained the nature of my said invention and described a way of constructing and using the same, although without attempting to set forth all of the forms in which it may be made, or all of the modes of its use, I claim:

1. A machine for recording graphically the average of the value of a series of variable quotations comprising means for successively indicating the various price quotations of a stock, manually controlled means for operating said indicating means, graphical recording means, means for operating said graphical recording means, and manually controlled means for connecting one operating means with the other whereby the recording means will simultaneously with the indication of the price quotations automatically record the fluctuations in the price quotations indicated by the indicating means.

2. A machine for recording graphically the average of the value of a series of variable quotations comprising means for successively indicating the various price quotations of a stock and comprising an indicator and a fractional scale, one movable relatively to the other, key operated means for operating said indicating means, graphical recording means, means for operating said graphical recording means, and key operated means for connecting one operating means with the other whereby the recording means will automatically record the fluctuations in the price quotations indicated by the indicating means.

3. A machine for recording graphically the average of the value of a series of variable quotations comprising means for successively indicating the various price quotations of a stock, means including manually actuated means for operating said indicating means, graphical recording means, means for operating said graphical recording means, and means including manually operated means for connecting one operating means with the other whereby the recording means will automatically record the fluctuations in the price quotations indicated by the indicating means.

4. A machine for recording graphically the average of the value of a series of variable quotations comprising means for successively indicating the various price quotations of a stock, means for graphically recording fluctuations in such price quotations and manually controlled means for operating both of said means simultaneously whereby as the successive price quotations are indicated the fluctuations therein will be graphically recorded by the recording means.

5. A machine for recording graphically the average of the value of a series of variable quotations comprising means for successively indicating the various price quotations of a stock, means for graphically recording fluctuations in such price quotations and key operated means for operating both of said means simultaneously one from the other whereby as the successive price quotations are indicated the fluctuations therein will be graphically recorded by the recording means.

6. A machine for recording graphically the average of the value of a series of variable quotations comprising indicating mechanism for successively indicating the various price quotations of a stock, means for operating said indicating mechanism, graphical recording mechanism comprising record receiving means, means for shifting it and a stylus cooperating with the record receiving means, operating means for laterally shifting said stylus relatively to said record receiving means, and means for connecting one operating means with the other whereby the recording mechanism will automatically record the fluctuations in the price quotations indicated by the indicating mechanism.

7. A machine for recording graphically the average of the value of a series of variable quotations comprising indicating mechanism for successively indicating the various price quotations of a stock, means for operating said indicating mechanism, graphical recording mechanism comprising record receiving means, means for shifting it and a stylus cooperating with the record receiving means, operating means for laterally shifting said stylus relatively to said record receiving means, and connecting means whereby by the operation of the first operating means the second operating means is caused to shift the stylus proportionately to the movement of the first operating means to record the price fluctuations indicated by the indicating means.

8. A machine for recording graphically the average of the value of a series of variable quotations comprising a plurality of indicating mechanisms each indicating the daily price fluctuations of a stock, means for operating said indicating mechanisms to display changed prices of such stocks, graphical recording mechanism, means for operating said graphical recording mechanism, and means for connecting the operating means for said indicating mechanisms with the operating means for said recording mechanism, whereby the successive change of each such stock prices will be graphically recorded by the recording means.

9. A machine for recording graphically the average of the value of a series of variable quotations comprising a plurality of indicating mechanisms each indicating the daily price fluctuation of a stock, means for operating said indicating mechanisms to display changed prices of such stocks, graphical recording mechanism, means for operating said graphical recording mechanism, and means for connecting the operating means for said indicating mechanisms with the operating means for the graphical recording mechanism whereby the successive change of each such stock prices will be graphically recorded by the recording means and whereby the composite average fluctuation of all of such stocks will be shown.

10. A machine for recording graphically the average of the value of a series of variable quotations comprising a plurality of indicating mechanisms each indicating successive price quotations of a stock including operating means therefor, record receiving means, a plurality of recording devices cooperating therewith, actuating means therefor, and means connecting the operating means and the actuating means whereby each successive operation of said indicating mechanisms will be effective to operate the actuating means and thereby one of said recording devices to record the average price change of all stocks represented and simultaneously another of said recording devices to record the average price change of a predetermined group of said stocks.

11. A machine for recording graphically the average of the value of a series of variable quotations comprising movable record receiving means, a recording device cooperating therewith, actuating means for shifting said recording device relatively to said record receiving means and comprising a rotatable cylinder connected with said recording device, indicating mechanism for successively displaying the price changes of a stock, operating means therefor, and means connecting the actuating means and the operating means whereby operation of the indicating mechanism will automatically proportionately rotate the cylinder and thereby actuate the recording device.

12. A machine for recording graphically the average of the value of a series of variable quotations comprising a graphical recording mechanism comprising a clock driven record receiving sheet and a stylus cooperating therewith, means to actuate the stylus comprising a rotatable cylinder and means connected therewith and with said stylus to impart motion thereto relatively to said sheet, indicating mechanism displaying various prices of a stock, lever controlled means including a shiftable belt for operating the indicating mechanism to display a changed price of the stock, tensioning means for said belt, and slidable lever controlled means connecting the first lever controlled means and the rotatable cylinder whereby on the operation of the former proportionate movement is imparted to the latter and thereby to the stylus to record such changes in the price.

13. A machine for recording graphically the average of the value of a series of variable quotations comprising mechanism for successively indicating the different price quotations of a stock including operating means therefor, and graphical recording mechanism including means operated by said operating means whereby the fluctuations in the price quotations indicated by the indicating means will be automatically recorded by the graphical recording means.

14. A machine for recording graphically the average of the value of a series of variable quotations comprising graphical recording mechanism comprising a record sheet, means for shifting it, a plurality of styluses cooperating therewith, a plurality of rotating rolls connected with said styluses, a plurality of indicating units each comprising a scale and a pointer one movable relatively to the other, a shiftable pointer also cooperating with said scale, a belt for shifting said last pointer, key operated means for shifting the belt forward or backward, and key operated means for holding said belt in contact with said rolls whereby on the movement of said belt the rolls will actuate the styluses.

15. A machine for recording graphically the average of the value of a series of variable quotations comprising graphical recording mechanism comprising a record sheet, means for shifting it, a plurality of styluses cooperating therewith, a plurality of rotating rolls connected with said styluses, a plurality of indicating units each comprising a scale and a pointer one movable relatively to the other, a shiftable pointer also cooperating with said scale, a belt for shifting said last pointer, key operated means for shifting the belt forward or backward, and key operated means including roller clutch mechanism for holding said belt in contact with said rolls whereby on the movement of said belt the rolls will actuate the styluses.

16. A machine for recording graphically the average of the value of a series of variable quotations comprising graphical recording mechanism comprising a record sheet, means for shifting it, a plurality of styluses cooperating therewith, a plurality of rotating rolls connected with said styluses, a plurality of indicating units each comprising a scale and a pointer one movable relatively to the other, a shiftable pointer also cooperating with said scale, a belt for shifting said last pointer, key operated means including ratchet operated means for shifting the belt forward or backward, and key operated means including roller clutch mechanism for holding said belt in contact with said rolls whereby on the movement of said belt the rolls will actuate the styluses.

17. A machine for recording graphically the average of the value of a series of variable quotations comprising graphical recording mechanism comprising a record sheet, means for shifting it, a plurality of styluses cooperating therewith, a plurality of rotating rolls of different lengths connected with said styluses, a plurality of of indicating units each comprising a scale and a pointer one movable relatively to the other, a shiftable pointer also cooperating with said scale, a belt for shifting said last pointer, key operated means including ratchet operated means for shifting the belt forward or backward, and key operated means including roller clutch mechanism for holding said belt in contact with said rolls whereby on the movement of said belt the rolls will actuate the styluses.

18. A machine for recording graphically the average of the value of a series of variable quotations comprising graphical recording mechanism comprising a record sheet, means for shifting it, a plurality of styluses cooperating therewith, a plurality of rotating rolls, one a long roll and the others shorter rolls cooperating with said long roll and connected with said styluses, a plurality of indicating units each comprising a scale and a pointer one movable relatively to the other, a shiftable pointer also cooperating with said scale, a belt for shifting said last pointer, key operated means including ratchet operated means for shifting the belt forward or backward, and key operated means including roller clutch mechanism for holding said belt in contact with said rolls whereby on the movement of said belt the rolls will actuate the styluses.

19. A machine for recording graphically the average of the value of a series of variable quotations comprising graphical recording mechanism consisting of a traveling record receiving means, means for shifting it, a plurality of styli co-operating with the record receiving means, means for operating said styli to shift the same laterally relatively to said record receiving means, a plurality of duplicate means for operating said styli operating means, means for connecting any one of said duplicate means with said styli operating means, and means for shifting each of said duplicate means in either direction whereby the recording mechanism will automatically record the desired data.

20. A machine for recording graphically the average of the value of a series of variable quotations comprising graphical recording mechanism consisting of a traveling record receiving means, means for shifting it, a plurality of styli co-operating with the record receiving means, means for operating said styli to shift the same laterally relatively to said record receiving means, a plurality of duplicate belts for operating said styli operating means, means for connecting any one of said duplicate belts with said styli operating means, and means for shifting each of said duplicate belts in either direction whereby the recording mechanism will automatically record the desired data.

21. A machine for recording graphically the average of the value of a series of variable quotations comprising graphical recording mechanism consisting of a traveling record receiving means, means for shifting it, a plurality of styli co-operating with the record receiving means, means for operating said styli to shift the same laterally relatively to said record receiving means, a plurality of duplicate means for operating said styli operating means, means for connecting any one of said duplicate means with said styli operating means, means for shifting each of said duplicate means in either direction whereby the recording mechanism will automatically record the desired data, and means co-operating with each of said duplicate means for indicating to the operator the direction and number of times each of said duplicate means is to be shifted.

22. A machine for recording graphically the average of the value of a series of variable quotations comprising a traveling record-receiving sheet, means for imparting thereto a traveling movement at a predetermined speed, a series of styli co-operating with said sheet, means including rotatable means and means operated thereby and connected with the styli for shifting them relatively to the sheet, operating means for rotating said rotatable means, key-operated means for engaging said operating means with the rotatable means, and key-operated means for shifting said operating means step by step.

23. A machine for recording graphically the average of the value of a series of variable quotations comprising a traveling record-receiving sheet, means for imparting thereto a traveling movement at a predetermined speed, a series of styli co-operating with said sheet, means including rotatable means and means operated thereby and connected with the styli for shifting them relatively to the sheet, operating means for rotating said rotatable means, key-operated means for engaging said operating means with the rotatable means, and key-operated means for shifting said operating means step by step and including means for reversing the direction of movement of said operating means.

24. A machine for recording graphically the average of the value of a series of variable quotations comprising a traveling record-receiving sheet, means for imparting thereto a traveling movement at a predetermined speed, a series of styli co-operating with said sheet, means including rotatable means and means operated thereby and connected with the styli for shifting them relatively to the sheet, operating means for rotating said rotatable means, key-operating means for engaging said operating means with the rotatable means, key-operated means for shifting said operating means step by step and including means for reversing the direction of movement of said operating means, and means co-operating with said operating means for indicating to the operator the number of times each key is to be depressed..

25. A machine for recording graphically the average of the value of a series of variable quotations comprising a clock-driven record-receiving sheet, a series of styli co-operating with said sheet, a plurality of rotatable cylinders, means operated thereby and connected with the styli for shifting them relatively to the sheet, a belt positioned to engage the cylinders and rotate the same, key-operated means for effecting engagement of the belt with the cylinders, key-operated means for shifting the belt step by step in one direction, and key-operated means for shifting the belt step by step in the opposite direction.

26. A machine for recording graphically the average of the value of a series of variable quotations comprising a clock-driven record-receiving sheet, a series of styli co-operating with said sheet, a plurality of rotatable cylinders, means operated thereby and connected with the styli for shifting them relatively to the sheet, a belt positioned to engage the cylinders and rotate the same, key-operated means for effecting engagement of the belt with the cylinders, key-operated means for shifting the belt step by step in one direction, and key-operated means for shifting the belt step by step in the opposite direction, said belt shifting key-operated means including reversible ratchet mechanism.

27. A machine for recording graphically the average of the value of a series of variable quotations comprising a clock-driven record-receiving sheet, a series of styli co-operating with said sheet, a plurality of rotatable cylinders, means operated thereby and connected with the styli for shifting them relatively to the sheet, a belt positioned to engage the cylinders and rotate the same, key-operated means for effecting engagement of the belt with the cylinders, key-operated means for shifting the belt step by step in one direction, key-operated means for shifting the belt step by step in the opposite direction, and means co-operating with said belt for indicating to the operator the number of times each key is to be depressed.

28. A machine for recording graphically the average of the value of a series of variable quotations comprising a clock-driven record-receiving sheet, a series of styli co-operating with said sheet, a series of rotatable cylinders of different lengths, means connecting the cylinders with the styli for shifting them relatively to the sheet, a plurality of traveling belts in position each to engage a pair of cylinders, a series of key-operated units one unit for each belt, each unit consisting of key-operated means for engaging the belt with its cylinders, key-operated means for shifting the belt in one direction, and key-operated means for shifting the belt in the opposite direction.

29. A machine for recording graphically the average of the value of a series of variable quotations comprising a clock-driven record-receiving sheet, a series of styli co-operating with said sheet, a series of rotatable cylinders of different lengths, means connecting the cylinders with the styli for shifting them relatively to the sheet, a plurality of traveling belts in position each to engage a pair of cylinders, a series of key-operated units one unit for each belt, each unit consisting of key-operated means for engaging the belt with its cylinders, key-operated means for shifting the belt in one direction, key-operated means for shifting the belt in the opposite direction, and means co-operating with each belt for indicating to the operator the proper number of times to depress the belt-shifting keys.

Signed at 1822-3-4 Park Row Building, New York city, N. Y., this 7th day of October, 1924.

HORACE B. HOLLAND.